United States Patent [19]

Lewis

[11] 4,101,893
[45] Jul. 18, 1978

[54] AIRCRAFT LANDING AID FOR ZERO-ZERO VISIBILITY LANDINGS

[75] Inventor: Bernard L. Lewis, Oxon Hill, Md.

[73] Assignee: The United States of America as represented by the Secretary of the Navy, Washington, D.C.

[21] Appl. No.: 822,175

[22] Filed: Aug. 5, 1977

[51] Int. Cl.² ............................................... G01S 1/16
[52] U.S. Cl. ............................ 343/108 R; 343/112 R
[58] Field of Search ..................... 343/108 R, 112 R, 1

[56] References Cited

U.S. PATENT DOCUMENTS

| | | | |
|---|---|---|---|
| 2,463,094 | 3/1949 | Field et al. | 343/112 R X |
| 3,237,195 | 2/1966 | Schiffman | 343/112 R |
| 3,952,309 | 4/1976 | Lammers | 343/108 R |

Primary Examiner—Maynard R. Wilbur
Assistant Examiner—Richard E. Berger
Attorney, Agent, or Firm—R. S. Sciascia; Philip Schneider; David G. Rasmussen

[57] ABSTRACT

An aircraft landing system which provides a pilot a perspective view of a runway on which he intends to land under zero visibility conditions. The system includes a multiplicity of microwave transmitters spaced at known intervals along both sides of a runway and a timing generator which causes the microwave transmitters to transmit in sequence. The aircraft contains a monopulse receiver which provides conventional azimuth angle video information to a CRT display and also provides range video information to a Y sweep generator. The latter Y sweep generator generates a sweep voltage for the Y axis of the CRT display which is of sufficient length to display all transmitted pulses from all microwave transmitters in sequence with the correct relative spacing between microwave transmitters.

7 Claims, 7 Drawing Figures

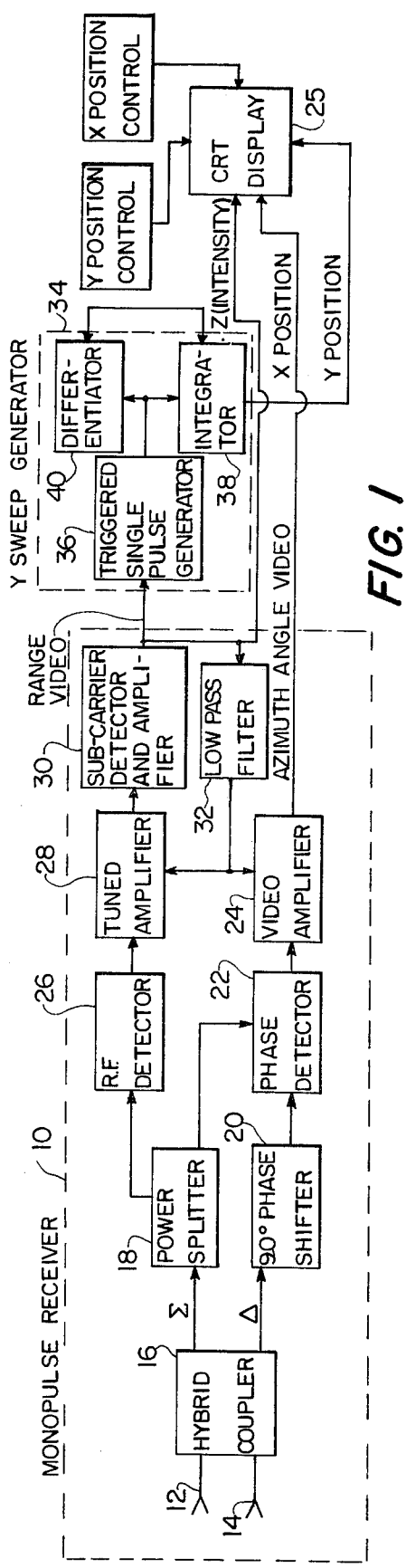
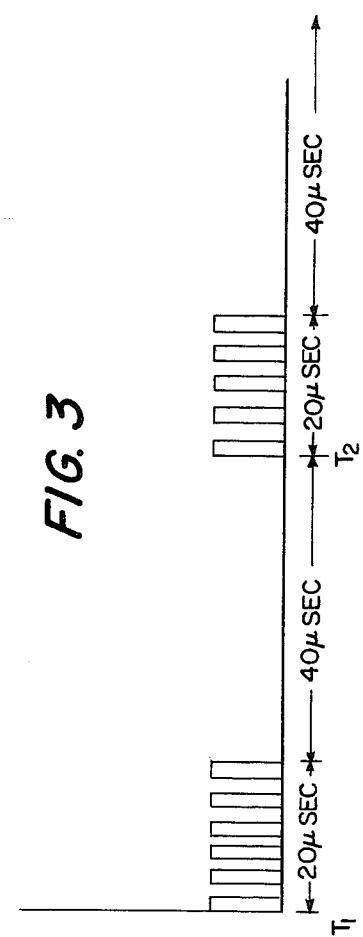
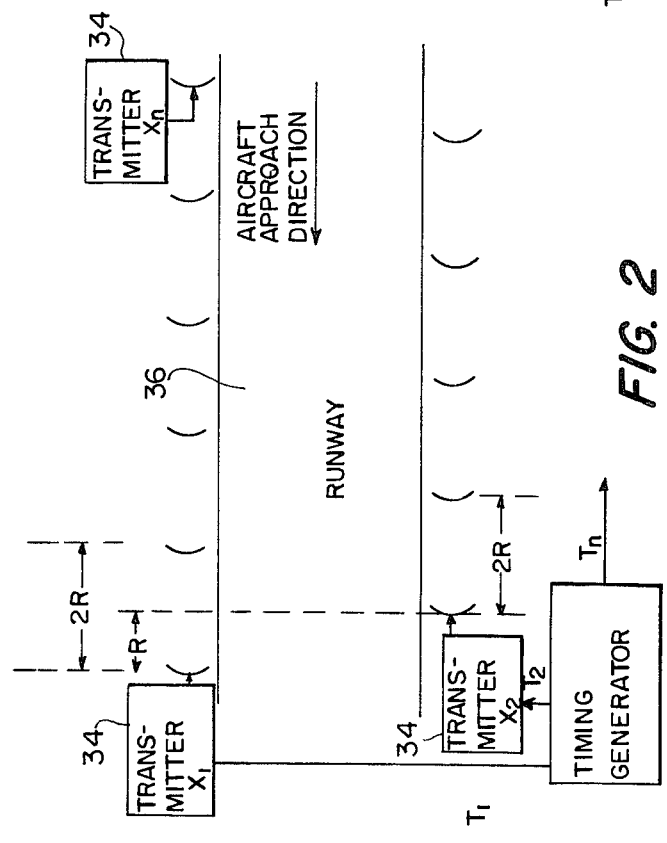

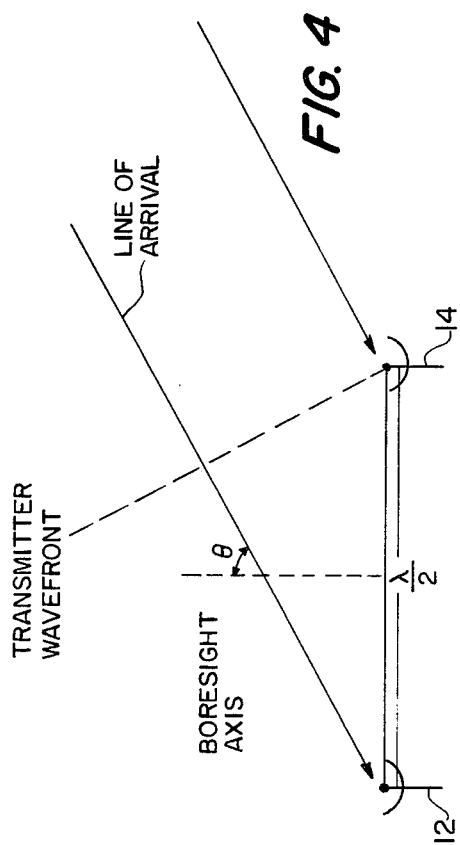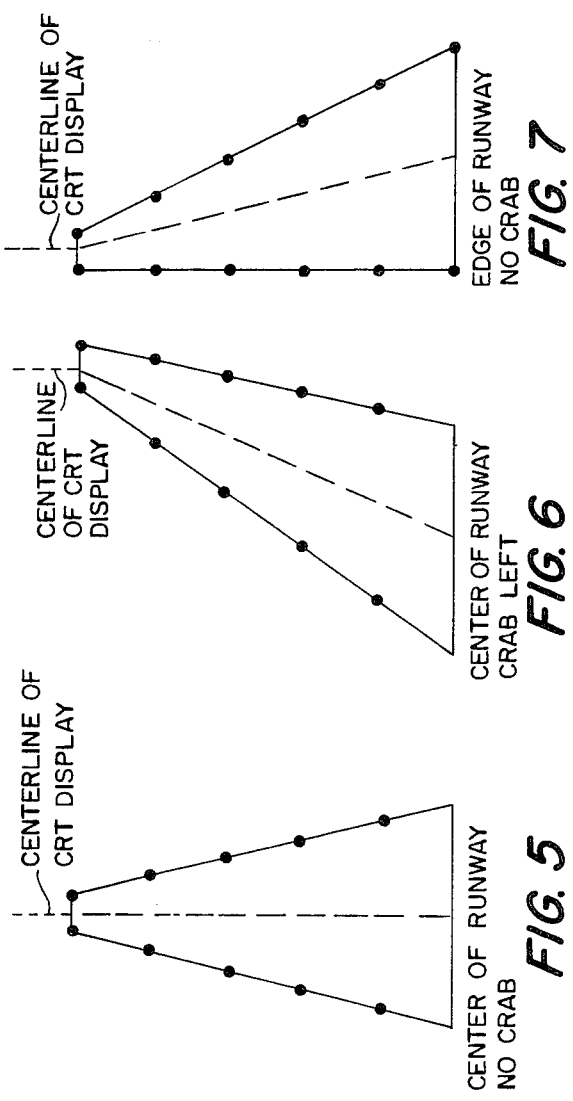

AIRCRAFT LANDING AID FOR ZERO-ZERO VISIBILITY LANDINGS

BACKGROUND OF THE INVENTION

1. Field of the Invention

The invention involves an aircraft landing system which will operate under zero visibility conditions. More specifically, the aircraft landing system provides the pilot a perspective view of a runway on which he intends to land.

2. Description of the Prior Art

It is essential that a pilot have an accurate aircraft landing system for use under conditions of zero visibility. Several types of systems are presently employed or proposed. One type of system uses an expensive surveillance radar to obtain a perspective view of the runway. This system requires a relatively large antenna to obtain the required azimuth resolution and a surveillance radar with a powerful short pulse transmitter, receiver and special display modes. Another type system uses radars and computers to guide the pilot in via radio links. An example is a Microwave Landing System (MLS). The MLS system is very expensive and complicated and cannot land an aircraft in zero-zero visibility conditions in the presence of winds across the runway. A third type of system involves the display of information derived from Visual-Omni-Range (VOR) receivers, gyros, and other equipment of this type. This last type of system is not as accurate as desired.

A fourth type of system is proposed in U.S. Pat. No. 3,237,195 to J. Schiffman. This system uses microwave beacons arranged on both sides of a runway which are triggered to insure that no two beacons transmit simultaneously. To receive these signals the aircraft uses a 3-channel hybrid, phase amplitude-comparison monopulse radar which includes a pattern of 4 antennas with different phase centers and different boresight axes with two in the vertical plane and two in the horizontal plane. The sum of the signals from the four antennas unblanks a CRT beam when beacon signals arrive. The monopulse radar uses the difference of the signals received by the horizontally oriented antennas to determine the azimuth angle between the beacon and the average boresight axis of the pair of antennas. A voltage proportional to the azimuth angle is used to control the azimuth (x axis) of a CRT display. The vertically oriented antennas in a similiar manner determine the elevation angle of the beacons from the average boresight axis of the two antennas. A voltage proportional to the elevation angle is fed to the Y axis of the CRT. The use of the azimuth information of the X axis, the elevation information on the Y axis, and the sum signal on the Z (intensity) axis provides a perspective view of the runway much the same as a pilot would view with his eyes.

The problem with this system lies in the use of elevation angle information on the Y axis to establish a perspective view. One deficiency is that for each ground beacon there is a transmitted signal and a multipath transmitted signal (reflected off the ground) which are both received by the monopulse receiver. The multipath signal causes the error in the elevation angle determination and hence distorts the display presentation. In addition, as the aircraft gets closer to or over the runway and all of the elevation angles of the beacons begin to get very large the perspective view begins to move down on the display.

SUMMARY OF THE INVENTION

The present invention is a landing system which overcomes the problems of the prior art by providing a perspective display of a runway (which may include approaches, taxiways, etc.) in which the Y axis is not determined by elevation angle but by the distance (range) over which the microwave transmitters extend. The landing system includes a multiplicity of microwave transmitters spaced at known intervals along both sides of the runway and approach. A timing generator produces signals which cause the microwave transmitters to transmit square-wave-modulated signals in sequence. The frequency of this square wave identifies the runway of interest. The time spacing between each signal is made proportional to the distance between the beacons (signal sources). The microwave transmitter furthest from the approach end of the runway begins the transmission sequence. The pulses are received by a monopulse receiver using a pair of antennas mounted adjacently in a horizontal plane. The signals received by the two antennas are processed by the monopulse receiver which outputs an azimuth angle video signal and a range video signal. The azimuth angle video signal is indicative of the azimuth angle of the microwave transmitter from the antenna boresight and is applied to the X position input of a CRT display to display the azimuth angle.

The range video signal is applied to the Z (intensity) input of the display to intensity modulate the display. The range video signal is also fed to a Y sweep generator which generates a linear sawtooth sweep voltage which is applied to the Y position input of the CRT display. The Y sweep is initiated with the range video signal from the first transmitted pulse received in any sequence and causes the position of the beam to vary linearly with time.

This Y sweep is calibrated to extend over the total length of time used for transmission of all pulses. The first signal to arrive triggers the Y sweep and places a dot on the top of the screen displaced from the X axis by an amount proportional to the azimuth angle of arrival of the signal with respect to the fore-and-aft axis of the aircraft. The next signal to arrive is painted lower on the screen than the first due to the Y sweep of the beam and at an X position corresponding to its azimuth location.

Since the spacing between each microwave transmitter is known, the time between transmissions from microwave transmitters is related to their spacing, and since the Y axis sweep is constant a picture of the edges of the runway seen in perspective from the aircraft is provided to the pilot.

The novel feature of the invention involves the transmission in sequence of each of the microwave transmitters at known times and the generation of a Y sweep beginning with the first transmitted pulse and lasting until the last transmitted pulse. This range information of the Y axis and the conventional azimuth angle information of the X axis provide a perspective view of the runway on the display.

BRIEF DESCRIPTION OF THE DRAWINGS

FIG. 1 is a block diagram of the aircraft receiver for an aircraft landing system which provides a pilot a perspective view of a runway.

FIG. 2 is a diagrammatic view of the placement of microwave transmitters of the aircraft landing system along the sides of the runway.

FIG. 3 is a diagrammatic view of a typical pulse train from the transmissions of the microwave transmitters.

FIG. 4 is a diagrammatic view of the arrangement of the pair of antennas shown is FIG. 1.

FIG. 5 is the perspective view, shown on the CRT display of FIG. 1, of a runway as seen in an aircraft approaching at the center of the runway and having no crab.

FIG. 6 is the perspective view, shown on the CRT display of FIG. 1, of a runway as seen in an aircraft approaching at the center of the runway and having a crab left.

FIG. 7 is the perspective view, shown on the CRT display of FIG. 1, of a runway as seen in an aircraft approaching at the left edge of the runway and having no crab.

DESCRIPTION OF THE PREFERRED EMBODIMENT

An aircraft landing system, according to the present invention, which gives a pilot a perspective view of a runway even in zero visibility includes a two channel monopulse receiver 10 on board the aircraft. In general terms monopulse receiver 10 utilizes two horizontally displaced antennas about a half wavelength apart to receive pulses from microwave transmitters along the runway. For example, operating at S-band, $\lambda$ would be about four inches. The receiver generates a range video signal and an azimuth angle video signal for each pulse. More specifically, monopulse receiver 10 includes a pair of antennas 12, 14 having an antenna arrangement as shown in FIG. 4. The two antennas are connected to two input ports of a hybrid coupler 16 (such as a rat-race or magic tee coupler), which forms the sum and difference of the antenna signals and provides the sum and difference signals at two output ports. The sum signal is fed to a power splitter 18, also a hybrid coupler, which splits the signal power equally between two output ports. The difference signal is fed to 90° phase shifter 20 which shifts the phase of the signal 90°. The phase shifter signal is fed to a phase detector 22 which also receives one of the sum signal outputs of power splitter 18. As in conventional monopulse receivers, the phase detector determines the phase difference between the sum and difference signals and the magnitude of the difference signal to obtain an output which is proportional to the azimuth angle between the fore and aft axis of the aircraft and the microwave transmitter. The output of phase detector 22 is amplified in video amplifier 24, whose gain is controlled by the magnitude of the sum signal via low pass filter 32, and provided as the azimuth-angle video out of monopulse reciever 10. The azimuth angle video is fed to the X-position input of a CRT display 25.

The second output of power splitter 18 is sent to RF detector 26 which removes the RF from the sum signal. The output of RF detector 26 is fed to tuned amplifier 28 which is tuned to the frequency of the square wave signal modulating the desired beacon transmitters. The output of tuned amplifier 28 is fed to subcarrier detector and amplifier 30 which forms the envelope of the sum signal from the transmitter (i.e., removes the square wave modulation) and provides the range video signal. One portion of the range video signal is fed to low pass filter 32 which controls the gains of tuned amplifier 28 and video amplifier 24 to make the sum video amplitude constant independent of range and to make the azimuth angle video voltage independent of range and only proportional to azimuth angle. Another portion of the range video signal is fed to the Z (intensity) terminal of a CRT display 25. The range video signal is also fed to a Y sweep generator 34 which generates a voltage which will produce a trace on CRT display 25 whose time length will be sufficient to display the returns from all of the microwave transmitters in a sequence. The Y-sweep generator 34, as shown in FIG. 1, includes triggered single pulse generator 36, integrator 38, and differentiator 40. Triggered single pulse generator 36 may be a one-shot oscillator. It receives the first sum video signal in a sequence, the leading edge of which triggers it and causes a pulse to be generated whose duration is the duration of the sweep signal of the display. The pulse is fed to integrator 38 which integrates the pulse to generate the linear sawtooth sweep voltage which is fed to the Y-position input of CRT display 32. Differentiator 40 senses the trailing edge of the pulse from triggered single pulse generator 36 and discharges the integrator thus terminating the sweep voltage to the display to stop the sweep and to return the beam to its start position. Associated with CRT display 32 are X- and Y-position controls which are conventional and allow control of the image positions on the display.

FIG. 2 shows the placement of microwave transmitters along the runway. Microwave transmitters $X_1$, $X_2$, ... $X_n$, designated 34, are placed along both sides of runway 36 with antennas pointing down the runway. Preferably, the spacing between the microwave transmitters on each side is 2R with those on one side displaced down the runway by a distance R from those on the opposite side in a staggered arrangement. However, the microwave transmitters may be located at any position along the runway as long as the spacing between transmitters is known. A timing generator 38 produces signals that activate the microwave transmitters in sequence, starting at microwave transmitter $X_1$ at time $T_1$. The signals are spaced apart in time in proportion to the distances between the microwave transmitters. This means the total time for completion of all transmissions is known and may be scaled to the Y axis of the CRT display 25 shown in FIG. 1. Therefore the locations of the microwave transmitters will be displayed at the correct relative positions along the Y axis of the display.

FIG. 3 shows the train of pulses transmitted by microwave transmitters $X_1 \ldots X_n$. At time $T_1$, microwave transmitter $X_1$ transmits a square wave-modulated signal with a square-wave frequency that identifies the runway or taxiway. The square wave may have a frequency of the order of 2 MHz and last for 20 microseconds after microwave transmitter $X_1$ stops. A time proportional to the distance between the first and second transmitters $X_1$ and $X_2$ is allowed to elapse before the microwave transmitter $X_2$ starts transmitting at $T_2$. For example, this time could be of the order of 40 microseconds. If all microwave transmitters are equally spaced, the total time for each transmission is 60 microseconds. If there are 30 microwave transmitters along the runway, the total time needed to transmit all signals is about 1800 microseconds. After the last microwave transmitter $X_n$ finishes transmitting, all transmitters on the runway stay off for about 50 milliseconds to allow the landing systems for other runways and taxiways to transmit with their own modulation frequencies.

FIG. 4 shows the antenna arrangement for antennas 12, 14 which are shown in FIG. 2. The antennas preferably are a half wavelength($\lambda$) apart and have the same gain and a boresight axis parallel to the aircraft fore and aft axis. Other antenna arrangements are possible but might be less desirable. The wavefront from a microwave transmitter is shown arriving from the right. The wavefront reaches antenna 14 first and arrives at antenna 12 at a later time. This difference in time causes a phase difference in the signals received at antennas 12, 14 that is proportional to the angle $\theta$ between the line of arrival and the normal to a line joining the two antennas at a point midway between the two antennas (the boresight axis). The signals are fed to the remainder of monopulse receiver 10 (FIG. 2) where the sum and difference of the responses are computed. From the sum and difference signals, the phase difference of the antenna responses is computed and azimuth angle of the microwave transmitter from the antenna boresight is determined.

FIG. 5 shows a perspective view of a runway as seen from CRT display 25 of FIG. 2. The aircraft is approaching the runway along the centerline with no crab angle. The microwave transmitters outline the edges of the runway. The solid lines shown are not present on the actual display image but are shown in the figure of illustrate the boundries of the runway.

FIG. 6 shows a perspective view of a runway with the aircraft approaching the runway along the centerline but with a crab to the left.

FIG. 7 shows a perspective view of the runway with the aircraft approaching along the left edge of the runway with no crab angle.

In operation, timing generator 38 of FIG. 3 sends out separate square wave modulated pulses to microwave transmitters $X_1 ... X_n$ starting with transmitter $X_1$. Upon receiving its pulse, transmitter $X_1$ radiates a square wave modulated RF pulse at time $T_1$ such as that shown in FIG. 3. Antennas 12, 14 both receive the coded pulse from microwave transmitter $X_1$. The signals from antennas 12, 14 are fed to hybrid coupler 16 which provides the sum of the antenna signals at one port and the difference of the antenna signals at a second port. The difference signal is sent through 90° phase shifter 20 to phase detector 22. The sum signal is sent through power splitter 18 to phase detector 22. In phase detector 22, the magnitude of the difference signal will be proportional to the magnitude of the azimuth angle between microwave transmitter $X_1$ and the antenna boresight and the phase between the sum and difference signals will indicate the polarity of the azimuth angle. The output of phase detector 22, the aximuth angle video, is then fed through video amplifier 24 which receives a feedback signal from low-pass filter 32. This feedback signal makes the amplitude of the azimuth angle video signal independent of range. The output of video amplifier 24 is then fed to the X position input of CRT display 25 to indicate what the X coordinate on the display should be for microwave transmitter $X_1$.

To obtain the Y coordinate for microwave transmitter $X_1$, the sum signal from power splitter 18 is fed to RF detector 26 which eliminates the RF. The output is fed to tuned amplifier 28 where the feedback signal coming from low-pass filter 32 makes the signal amplitude independent of range. The output is fed to subcarrier detector and amplifier 30 which decodes the sum signal to obtain the envelope of the transmitted signal from microwave transmitter $X_1$. This is the range video signal. This signal is fed to triggered pulse generator 36 which utilizes the leading edge of the envelope to trigger and generate a pulse whose length in time is the desired length in time of the Y sweep of CRT display 25. The pulse from triggered signal pulse generator 36 is fed to integrator 38 which integrates the pulse to form a sawtooth voltage which is fed to the Y-position input of CRT display 25. The beginning of the integrated pulse corresponds in time to the reception of the first transmitted signal from microwave transmitter $X_1$. Therefore, the beginning of the Y sweep corresponds to the time of reception of the first transmitted pulse. The Y sweep begins at the top of the CRT and sweeps down with a constant velocity until it terminates before hitting the bottom of the display. The length of the sweep is calibrated to the total length of time for transmission of all microwave transmitters $X_1 ... X_n$.

Since both the X- and Y-position inputs are related to signals sent by microwave transmitter $X_1$ the position of $X_1$ is defined on the display.

The second transmitter pulse for microwave transmitter $X_2$ will be similiarly displayed but the Y trace will have moved downward on the display. Pulses from microwave transmitters $X_3$-$X_n$ will similiarly be displayed along the Y trace. If microwave transmitters $X_1 ... X_n$ are spaced at equidistant intervals, the view on the display will be a perspective display with the positions of the microwave transmitters at equidistant spacing on the display and outlining the runway. If the microwave transmitters are not spaced at equidistant intervals, along the runway, they will still show up in the correct relative positions on the display. FIGS. 5, 6, and 7 illustrate the various perspective views that a pilot may see when the aircraft approaches with a crab angle or along the side of the runway.

After the last microwave transmitter ($X_n$) pulse is received and displayed on CRT display 25, the trailing edge of the pulse from triggered single pulse generator 36 will be detected by differentiator 40 which will cause the Y trace to terminate by discharging integrator 38 and returning the CRT beam to its start position, ready for the next sequence.

The landing system described has several advantages over the prior art systems and specifically the system disclosed in U.S. Pat. No. 3,237,195 to J. Schiffman. As previously stated, the Schiffman system will have inaccuracy along the Y axis of the display since it uses elevation angle measurements, which are subject to multipath errors, to control the Y sweep. In addition, use of elevation angle measurements causes the display image to move vertically as the aircraft gets closer to the runway. Since the present invention does not use elevation angle information but instead uses a Y sweep determined by range information it overcomes these problems. There is no measurement of elevation angle and hence no concern about multipath errors. In addition, since the Y sweep is started at a designated point on the Y axis of the display by the first microwave transmitter and the length of the Y sweep stays constant, as the aircraft moves closer to the runway the display image does not move on the Y axis and displayed microwave transmitters merely drop off the display as the aircraft flies over them.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the Unites States is:

1. An aircraft landing system for providing a perspective view of a runway to a pilot comprising:

a multiplicity of microwave transmitter means spaced at known intervals along both sides of said runway for transmitting pulses;

timing generator means for producing sequential signals which cause said microwave transmitters to transmit in sequence, the time spacing between each signal being related to the distance between the microwave transmitter to be triggered and the previous sequential microwave transmitter;

monopulse receiver means including a pair of spaced antennas mounted in a horizontal plane for receiving said transmitted pulses and for generating a range video signal and azimuth angle video signal for each pulse;

Y-sweep generator means for generating a sweep voltage in response to the sum video signal for the first transmitted pulse, said sweep voltage having a time length at least as long as the time required to receive all transmitted pulses;

CRT display means having X- and Y-position inputs and a Z intensity input, said X position input receiving said azimuth angle video signal for each received pulse to display the azimuth angle on the X axis for each microwave transmitter, said Y position input receiving said sweep voltage for generating a Y sweep of sufficient length to display all transmitted pulses in a sequence, and said Z position input receiving said sum signal to intensity-modulate said CRT display.

2. The aircraft landing system of claim 1, in which said sequential signals from said timing generator are square-wave-modulated pulses which are coded to provide runway identification information.

3. The apparatus of claim 1, in which said monopulse receiver comprises:

hybrid coupler means receiving the outputs of said pair of antennas for finding the sum and difference of the two antenna signals and providing an output of a sum signal and a difference signal, power splitter means for receiving and splitting said sum signal into two outputs, phase shifter means for receiving and shifting said difference signal by 90°, phase detector means for receiving and comparing the phase of an output from said power splitter means and an output from said phase shifter means to obtain an output signal indicative of azimuth angle, video amplifier means for receiving and amplifying the output of said phase detector, the output of said video amplifier being an azimuth video signal which is applied to the X position input of the CRT, RF detector means for receiving and detecting one of said outputs from said power splitter means, tuned amplifier means for receiving and amplifying the output of said RF detector, subcarrier detector and amplifier means for receiving and detecting the envelope of the output of said tuned amplifier, the output of said subcarrier detector and amplifier being a range video signal which is fed to said Y sweep generator.

4. The apparatus of claim 1, in which said Y sweep generator comprises:

triggered single pulse generator means for generating a trigger pulse whose time length determines the length of said Y sweep, integrator means receiving and integrating said triggered pulse for generating said sweep voltage applied to said Y position input, differentiator means receiving said triggered pulse for detecting the trailing edge of said pulse and discharging said integrator to terminate the sweep voltage to said CRT display to stop the sweep.

5. The apparatus of claim 4 in which said monopulse receiver comprises:

hybrid coupler means receiving the outputs of said pair of antennas for finding the sum and difference of the two antenna signals and providing an output of a sum signal and a difference signal, power splitter means for receiving and splitting said sum signal into two outputs, shape shifter means for receiving and shifting said difference signal by 90° phase detector means for receiving and comparing the phase of an output from said power splitter means and an output from said phase shifter means to obtain an output signal indicative of azimuth angle, video amplifier means for receiving and amplifying the output of said phase detector, the output of said video amplifier being an azimuth angle video signal which is applied to the X position input of the CRT, RF detector means for receiving and detecting one of said outputs from said power splitter means, tuned amplifier means for receiving and amplifying the output of said RF detector, subcarrier detector and amplifier means for receiving and detecting the envelope of the output of said tuned amplifier, the output of said subcarrier detector and amplifier being a range video signal which is fed to said Y sweep generator.

6. The apparatus of claim 1, in which said microwave transmitters on each side of a runway are equally spaced with the microwave transmitters on one side located midway between the microwave transmitters on the other side.

7. The apparatus of claim 1, in which said microwave transmitters code their transmitter pulses to provide identification information.

* * * * *